United States Patent
Launais et al.

(10) Patent No.: US 7,071,445 B2
(45) Date of Patent: Jul. 4, 2006

(54) SINGLE-PASS LASER WELDING METHOD OF A T ASSEMBLY OF METALLIC PARTS

(75) Inventors: Herve Launais, Brunoy (FR); Thierry Flesch, Pringy (FR); Dominique Mignot, Soisy sur Seine (FR); Michel Allouard, Epinay sur Orge (FR)

(73) Assignee: Snecma Moteurs, Paris (FR)

( * ) Notice: Subject to any disclaimer, the term of this patent is extended or adjusted under 35 U.S.C. 154(b) by 68 days.

(21) Appl. No.: 10/694,853

(22) Filed: Oct. 29, 2003

(65) Prior Publication Data

US 2004/0089641 A1    May 13, 2004

(30) Foreign Application Priority Data

Nov. 7, 2002  (FR) .................................. 02 13914

(51) Int. Cl.
*B23K 26/00* (2006.01)
(52) U.S. Cl. ............................. 219/121.64; 219/121.85
(58) Field of Classification Search ........... 219/121.64, 219/121.85, 121.63, 121.6
See application file for complete search history.

(56) References Cited

U.S. PATENT DOCUMENTS

| | | | | |
|---|---|---|---|---|
| 4,661,677 A | * | 4/1987 | La Rocca | ............... 219/121.64 |
| 4,691,093 A | * | 9/1987 | Banas et al. | ............ 219/121.63 |
| 4,866,242 A | * | 9/1989 | Martyr | ................... 219/121.64 |
| 5,483,034 A | * | 1/1996 | Havard et al. | ......... 219/121.64 |
| 6,146,094 A | | 11/2000 | Obana et al. | |

FOREIGN PATENT DOCUMENTS

| | | |
|---|---|---|
| DE | 195 21 892 | 8/1996 |
| DE | 195 33 831 | 1/1997 |
| DE | 199 07 926 | 12/2000 |
| EP | 0 890 745 | 1/1999 |
| EP | 1 312 435 | 5/2003 |
| FR | 2 705 603 | 12/1994 |
| FR | 2 789 609 | 8/2000 |

\* cited by examiner

*Primary Examiner*—M. Alexandra Elve
(74) *Attorney, Agent, or Firm*—Oblon, Spivak, McClelland, Maier & Neustadt, P.C.

(57) ABSTRACT

The method is used to attach the various parts of a "T" assembly using a single laser welding pass from the outside of the "T" assembly.

Welding is done with a bifocal welding head (20) the two axes (21) of which are parallel to a surface of the part forming the "T" stem (10), the weld being made along the entire length of the assembly.

To be used when manufacturing vanes for a turbo jet fan duct.

23 Claims, 3 Drawing Sheets

SINGLE-PASS LASER WELDING METHOD OF A T ASSEMBLY OF METALLIC PARTS

DESCRIPTION

1. Domain of the Invention

The invention relates to the permanent attachment of a two or three-part metallic assembly in the shape of a "T" accessible only on one outside face. It is used particularly to assemble a thin, closed and partitioned shroud such as a vane placed in the fan duct, on the output side of the fan in a turbojet.

2. Prior Art and Problem That Arises

The function of this type of vane is to stiffen the turbojet structure, particularly by creating a connection between two coaxial annular envelopes, and possibly to guide or deviate the cold air flow circulating in the fan duct. These vanes are metallic blades preferably composed of a hollow shroud inside which stiffener elements are placed. These shrouds are difficult to make and many operations are necessary, particularly for making primary parts and for making the assembly and the attachment such that the dimensions of the shroud are correct.

With reference to FIG. 1, patent document FR 2 705 603 divulges a laser welding method for an assembly of two metallic parts in the form of a T. This method provides the means of making partitioned shrouds by fastening parts from the outside of the shrouds. A laser beam 8A, 8B is fired twice in succession at an inclined angle, with the path intersecting at the outer surface 1B of the part 1 forming the head of the T assembly. The two axes of the laser weld 8A and 8B touch two top corners 2C of the part 2 acting as the stem of the T. The welding device is placed outside of the shroud, in other words on the side of the top surface 1B of the head 1 of the T.

Therefore, this method uses two successive passes of a laser beam each of which causes successive deformations.

It can be added that this type of assembly requires additional material in the form of filler wire, in order to prevent shape defects after welding. This is particularly applicable to roughness and various recesses and undercuts. Furthermore, the tooling investment is relatively expensive because parts need to be held in position with respect to each other continuously and the use of a filler wire unwinder. Finally, it is essential that the wire position should be controlled during welding.

Therefore, the purpose of the invention is to overcome these disadvantages.

SUMMARY OF THE INVENTION

The main purpose of the invention is a laser welding method for the assembly of metal parts arranged in the shape of a T, the stem of the T being formed of a plate with parallel surfaces, the assembly only being accessible from the head side of the T, through an external surface, the method comprising the following phases:

T assembly of parts adjacent to each other,
laser welding of the assembly through the outer surface of the T head, by two welds.

According to the invention, the two welds are made at the same time and are parallel to each other and perpendicular to the top surface of the head of the T, such that each of the two welding axes is tangent to one of the surfaces of the plate forming the stem of the T.

In one preferred embodiment of the invention, the two welds are made simultaneously with a bifocal welding head.

In a first embodiment of the assembly using the welding method according to the invention, the stem plate of the T is provided with tabs with a determined length and thickness, and the assembly includes a second part forming the head of the T with slots with length and thickness corresponding to the dimensions of the tabs on the stem plate of the T.

In this case, it is advantageous if the height H of the tabs is slightly more than the thickness of the second part of the assembly forming the head of the T.

In a second embodiment of the T assembly using the welding method according to the invention, the head of the T is formed of two plates perpendicular to the stem of the T and with their edge in contact with the stem plate.

LIST OF FIGURES

The invention and its various technical characteristics will be better understood after reading the following description of two embodiments of the invention. This description is accompanied by figures.

FIG. 1, already described, is a section through an assembly using a welding method according to prior art.

DETAILED PRESENTATION OF THE TWO EMBODIMENTS OF THE INVENTION

First Assembly

Figure 1:
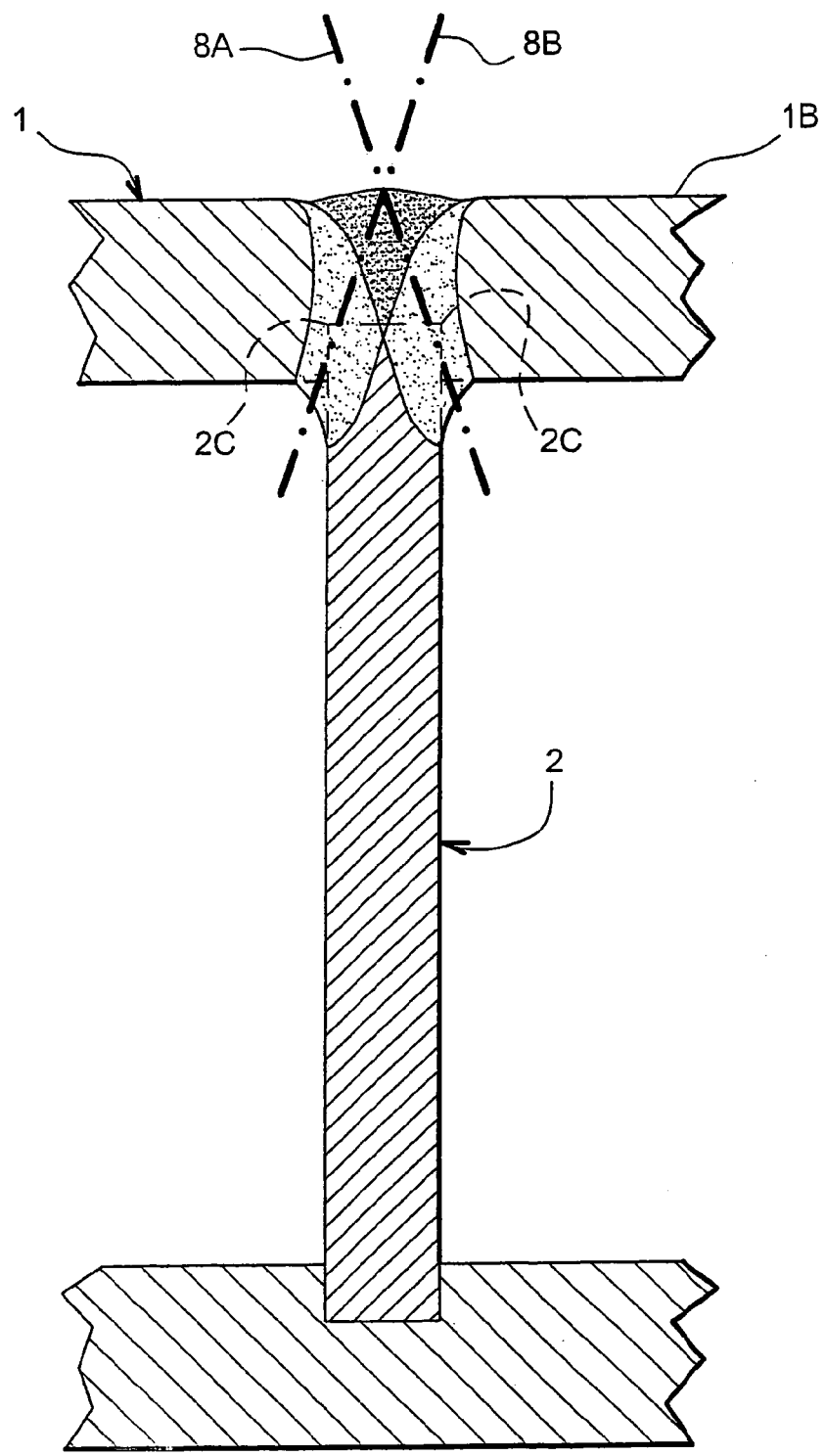
Figure 2:
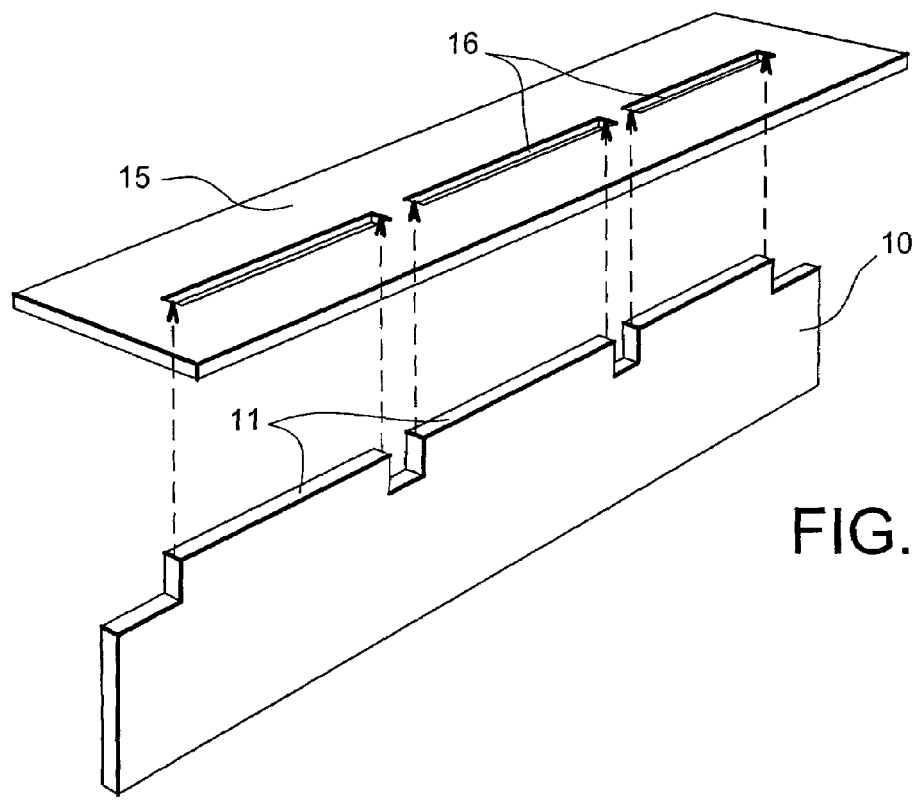
FIG. 2 shows an exploded isometric view of the first step in making an assembly according to a first embodiment of the invention.
Figure 3:
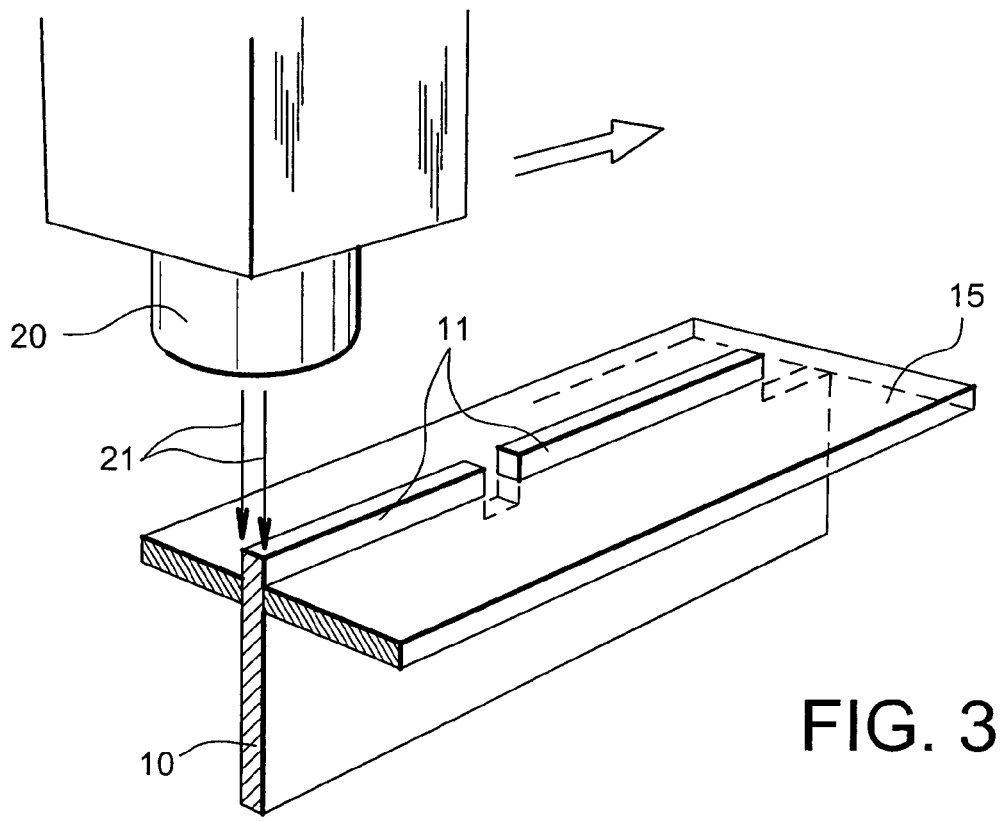
FIG. 3 shows an isometric view of the same assembly as in FIG. 2, during the welding phase.

With reference to FIG. 2, a first assembly that can be welded using the method according to the invention consists of two parts: a stem part 10 of the T and the head part 15 of the T. The stem part 10 is a rectangular plate with a determined thickness with tabs 11 of a determined length and also spaced in a determined manner. Correspondingly, slots 16 are formed in the head part 15 with a length and width corresponding to the length and width respectively of the tabs 11 in the stem part 10. With reference to FIG. 3, it can easily be understood that the assembly consists of inserting the tabs 11 on the stem part 10 into the slots 16 in the head part 15.

A laser welding head 20 is placed vertically above the tabs 11 of the assembly. This laser welding head 20 is of the bifocal type, in other words it can emit two laser beams 21 parallel to each other. The laser welding head 20 is adjusted such that the two laser beams 21 are at a spacing equal to a given separation distance equal to the thickness of the stem part 10. In other words, each of the two laser beams is tangent to one surface of the stem part 10.

It is intended to cut the tabs 11 of the stem part and the slots 16 in the head part 15 by laser cutting, but other cutting methods could be used.

Therefore, welding on both sides of the top of the stem part 10 along and between the tabs 11 is done in a single pass by longitudinal displacement of the laser welding head 20.

Figure 4:
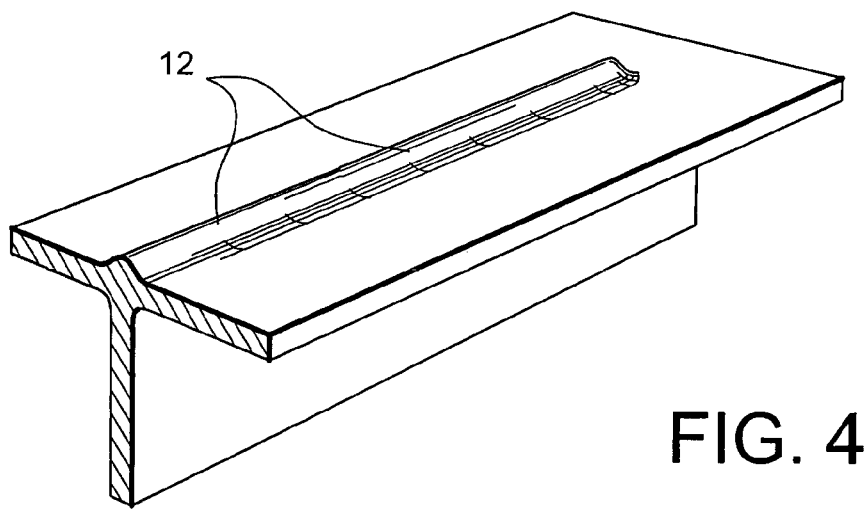
FIG. 4 shows the assembly in FIGS. 2 and 3 once completed.

The height of the tabs 11 is slightly more than the thickness of the head part 15 so that they project beyond it slightly. As shown in FIG. 4, once welding is complete, these tabs 11 that supplied filler metal are transformed into slight bumps 12. The height of the welding seam after welding will increase as the height of the tabs 11 before welding increases.

Second Assembly

Figure 5:
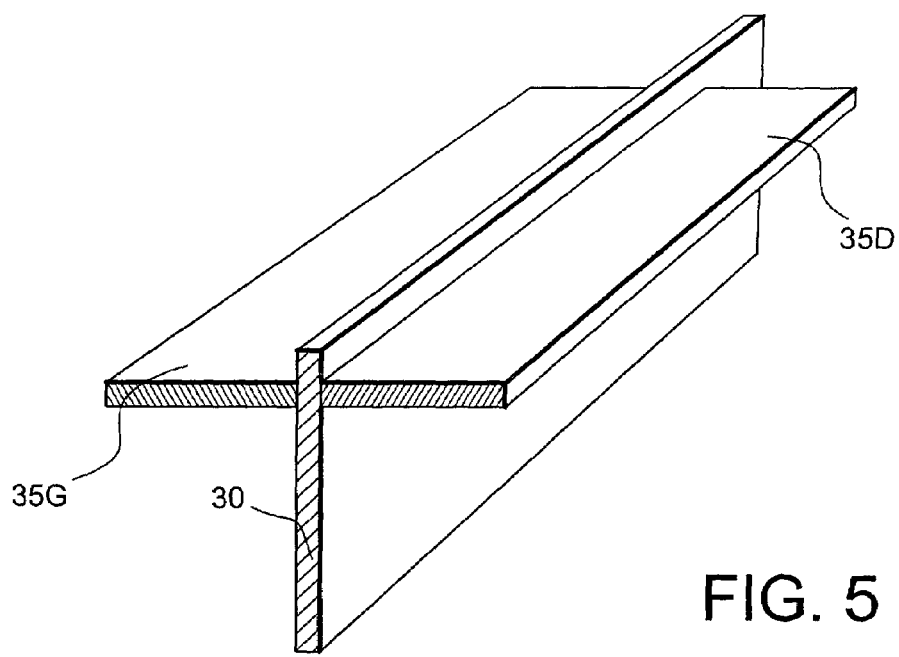
FIG. 5 shows an isometric view of a second assembly to be welded using the welding method according to the invention.

FIG. 5 shows a second assembly that can be used to make the T using a laser welded attachment. A stem part 30 is still used, but without tabs. Two head parts 35D and 35G are placed in contact with the stem part 30, and near the top of it. They are fixed to it at one of their edges and therefore project from it perpendicularly. They are also in line with each other.

A bifocal weld, as described above for the previous assembly, can be used in exactly the same way, each of the two axes of the two laser beams 21 being parallel to a vertical face of the stem part 30, the weld being made along the entire length of the assembly.

The main advantage of the invention is that welding is done in a single pass without the need for any filler wire. The result is thus a weld seam without any shape defect and the risks of the assembly being deformed during the weld are minimized.

The invention claimed is:

1. Laser welding method for the assembly of metal parts arranged in the shape of a T, the stem of the T being formed of a stem plate with parallel surfaces, the assembly only being accessible from the head side of the T, through an external surface, the method comprising the following phases: T assembly of parts adjacent to each other, laser welding of the assembly through the outer surface of the T head, by two welds made at the same time and with welding axes parallel to each other and perpendicular to the top surface of the head of the T, such that each a first axis of the two welding axes is tangent to a first surface of the parallel surfaces of the stem plate and a second axis of the two welding axes is tangent to a second surface of the parallel surfaces of the stem plate.

2. Laser welding method according to claim 1, wherein the two welds are made simultaneously with a bifocal welding head.

3. Laser welding method according to claim 1, wherein the stem plate is provided with tabs with a determined length and thickness, and the assembly includes a second part called the head part forming the head of the T and provided with slots with length and thickness corresponding to the dimensions of the tabs.

4. Laser welding method according to claim 3, wherein the height of the tabs is slightly more than the thickness of the head part.

5. Laser welding method according to claim 1, wherein the head of the T is formed of two plates installed perpendicular to the plate of the T stem and with their edge in contact with the stem plate.

6. A method for welding a first part to a second part, said first part having a plate with a first surface and a second surface, wherein said first and second surfaces are opposite each other, the method comprising the following steps: positioning each of said first and second surfaces of said first part adjacent to said second part;

generating a first laser beam and a second laser beam, wherein said first and second laser beams are parallel to each other; and directing the first beam so as to produce a first weld between the first surface of said first part and said second part, and simulatenously directing the second beam so as to produce a second weld between the second surface of said first part and said second part, wherein said directing step is performed so that said first beam is tangent to said first surface of said first part and said second beam is tangent to said second surface of said first part.

7. The method according to claim 6, wherein said first and second parts are made of metal.

8. The method according to claim 6, wherein said first and second parts are configured to form a T-shaped assembly.

9. The method according to claim 8, wherein said first part is a stem for said T-shaped assembly.

10. The method according to claim 6, wherein said first and second surfaces of said plate are parallel to each other.

11. The method according to claim 8, wherein said T-shaped shaped assembly is only accessible from a head side of the T-shaped assembly.

12. The method according to claim 11, wherein said T-shaped assembly is only accessible through an external surface of said head side of said T-shaped assembly.

13. The method according to claim 6, wherein said step of positioning comprises assembling said first and second parts into a T-shaped assembly.

14. The method according to claim 6, wherein said step of positioning comprises inserting said first and second surfaces of said first part into a slot of said second part.

15. The method according to claim 8, wherein said directing step is performed through an outer surface of a head side of said T-shaped assembly.

16. The method according to claim 6, wherein said generating step is performed so that said first and second laser beams are separated from each other by a distance equal to a thickness of said plate of said first part.

17. The method according to claim 6, wherein said directing step is performed so that said first and second beams are perpendicular to a surface of said second part.

18. The method according to claim 8, wherein said directing step is performed so that said first and second beams are perpendicular to a top surface of a head side of the T-shaped assembly.

19. The method according to claim 6, wherein said first and second welds are produced along lengths of said first and second parts with a single pass of a laser over said lengths.

20. The method according to claim 6, wherein said directing step is performed so that said first beam is parallel to said first surface of said first part and said second beam is parallel to said second surface of said first part.

21. The method according to claim 6, wherein the first part comprises tabs and the second part comprises slots, each slot having a length and a thickness corresponding to a length and a thickness of a tab.

22. The method according to claim 21, wherein each of the tabs has a height geater than a thickness of the second part.

23. The method according to claim 6, wherein the second part comprises two plates and said positioning step is performed so as to place said two plates perpendicular to and in contact with the plate of the first part.

* * * * *

UNITED STATES PATENT AND TRADEMARK OFFICE
CERTIFICATE OF CORRECTION

| | | |
|---|---|---|
| PATENT NO. | : 7,071,445 B2 | Page 1 of 1 |
| APPLICATION NO. | : 10/694853 | |
| DATED | : July 4, 2006 | |
| INVENTOR(S) | : Herve Launais et al. | |

It is certified that error appears in the above-identified patent and that said Letters Patent is hereby corrected as shown below:

In column 13, line 32, delete "each."

Signed and Sealed this

Twentieth Day of February, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,071,445 B2 |
| APPLICATION NO. | : 10/694853 |
| DATED | : July 4, 2006 |
| INVENTOR(S) | : Herve Launais et al. |

It is certified that error appears in the above-identified patent and that said Letters Patent is hereby corrected as shown below:

In column 3, line 32, delete "each."

This certificate supersedes Certificate of Correction issued February 20, 2007.

Signed and Sealed this

Eighth Day of May, 2007

JON W. DUDAS
*Director of the United States Patent and Trademark Office*